(No Model.)

C. A. BARTLIFF.
NUT LOCKING WASHER.

No. 541,708. Patented June 25, 1895.

WITNESSES
Geo. M. Anderson
Phil C. Mosi.

INVENTOR
Chas. A. Bartliff.
by E. W. Anderson
his Attorney

THE NORRIS PETERS CO., PHOTO-LITHO., WASHINGTON, D. C.

UNITED STATES PATENT OFFICE.

CHARLES A. BARTLIFF, OF MEMPHIS, TENNESSEE.

NUT-LOCKING WASHER.

SPECIFICATION forming part of Letters Patent No. 541,708, dated June 25, 1895.

Application filed March 15, 1895. Serial No. 541,913. (No model.)

*To all whom it may concern:*

Be it known that I, CHARLES A. BARTLIFF, a citizen of the Dominion of Canada, and a resident of Memphis, in the county of Shelby and State of Tennessee, have invented certain new and useful Improvements in Nut-Locking Washers; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
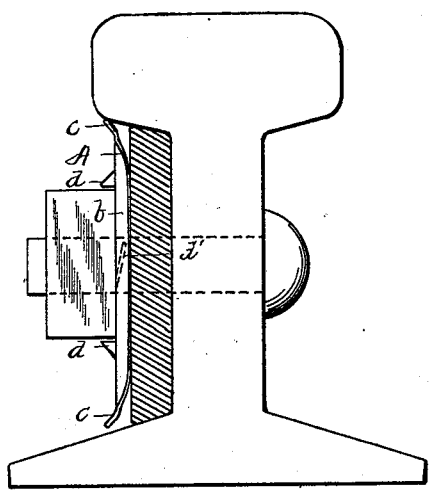
Figure 2:
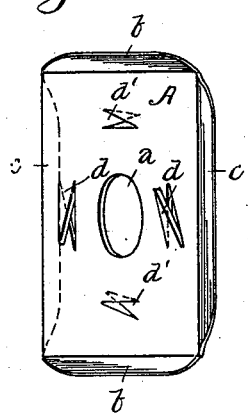

Figure 1 of the drawings is a representation of sectional view showing the application of the invention. Fig. 2 is a perspective view of lock.

The object of this invention is to provide a washer for nuts which will form an effective lock for the nut and bolt; a further object being to provide a washer of this character which is perfectly reversible in its application, whereby it is not only immaterial which side of it is applied in use, but which also enables it to be used a second time after the nut holding devices upon one side have been destroyed, by simply reversing it face for face.

With these objects in view, the invention consists in the novel construction, and combination of parts, all as hereinafter described and pointed out in the appended claim.

The washer more particularly consists of a comparatively thin metallic plate A of spring character, and rectangular in form. At the center of said plate is an opening $a$ for the bolt. Two of its opposite edges $b$, $b$, are bent or struck in one direction to form a support for the plate when used one side up, and its other two edges are bent or struck in the opposite direction to support the plate when used the opposite side up, the corners being rounded off, as shown, to facilitate these bends.

Between the central opening $a$ and the edge flanges are a number of spring lips or tongues $d$, $d'$, which are cut or struck out of the body of the metal. One or more of these lips or tongues $d$ are sprung outwardly beyond the plane of one face of the plate, while the tongue or tongues $d'$ are similarly sprung beyond the opposite face, but in the opposite direction.

It will be seen that in applying the washer, it is perfectly immaterial which way it is used. As the nut is screwed home it rides readily over the lips $d$ or $d'$ to its seat against the body of the washer, said lips springing against the lateral faces of the nut to prevent its reverse movement. Upon a rail joint, where the invention is of particular value, the engagement of the edges of the washer with the flanges of the rails prevents the washer and nut from turning, the dimensions of the plate being equal to the height of the web portion of the rail.

The flanges $b$, $b$, or $c$, $c$, which seat against the fish plate, not only cause the entire washer to form a spring seat for the nut, but they also hold the washer sufficiently away from the fish plate to prevent injury to the spring lips $d$ or $d'$ which are upon that side. Were the washer to seat flush against the fish plate, these lips would be forced back into their slots, and after being held there for some time would lose their spring character and be of no value when the washer is reversed.

To remove the nut at any time a wrench is applied and the locking lips are wound or broken off the washer by the forcible turning of the nut. Were it not for its reversibility, the washer would be of no further use, but owing to said property it can be used a second time as effectively as the first. It will also appear that the turning of the flanges $b$, $b$, and $c$, $c$, adds considerably to the strength of the washer.

Having thus described my invention, what I claim as new, and desire to secure by Letters Patent, is—

The herein described nut locking washer, comprising a rectangular spring metal plate, through which the bolt centrally passes, said plate having two of its opposite edges struck or bent to one side, and its other two opposite edges to the opposite side, and a number of spring lips or tongues cut or struck from said plate, alternate lips or tongues being sprung to opposite sides of the plate, and extending in opposite directions, said lips or tongues forming locks for the nut, substantially as specified.

In testimony whereof I affix my signature in presence of two witnesses.

CHARLES A. BARTLIFF.

Witnesses:
PHILIP C. MASI,
GEORGE H. PARMELEE.